US009651938B2

United States Patent
Mitsuhashi et al.

(10) Patent No.: US 9,651,938 B2
(45) Date of Patent: May 16, 2017

(54) INTERFERENCE CHECKING DEVICE

(71) Applicant: DMG MORI SEIKI CO., LTD., Nara (JP)

(72) Inventors: Susumu Mitsuhashi, Nara (JP); Takayuki Nakamura, Nara (JP); Tetsushi Asada, Nara (JP); Tetsuo Ogawa, Nara (JP); Yuzuru Sakuta, Nara (JP)

(73) Assignee: DMG MORI SEIKI CO., LTD., Nara (JP)

( * ) Notice: Subject to any disclaimer, the term of this patent is extended or adjusted under 35 U.S.C. 154(b) by 360 days.

(21) Appl. No.: 14/450,768

(22) Filed: Aug. 4, 2014

(65) Prior Publication Data
US 2015/0045941 A1 Feb. 12, 2015

(30) Foreign Application Priority Data

Aug. 12, 2013 (JP) .................................. 2013-167368

(51) Int. Cl.
*G06F 19/00* (2011.01)
*G05B 19/4061* (2006.01)

(52) U.S. Cl.
CPC ............... *G05B 19/4061* (2013.01); *G05B 2219/35316* (2013.01)

(58) Field of Classification Search
CPC ................. G05B 19/4061; G05B 2219/35316
USPC ........................................................ 700/178
See application file for complete search history.

(56) References Cited

U.S. PATENT DOCUMENTS

| 4,994,977 A * | 2/1991 | Tsujido | G05B 19/4061 700/178 |
| 5,734,573 A * | 3/1998 | Niwa | G05B 19/4069 700/178 |
| 2005/0283270 A1* | 12/2005 | Nakamura | G05B 19/4069 700/178 |
| 2009/0062955 A1* | 3/2009 | Ide | G05B 19/4061 700/178 |

FOREIGN PATENT DOCUMENTS

| JP | H0816225 A | 1/1996 |
| JP | 10055209 | 2/1998 |
| JP | 2009054043 | 3/2009 |

\* cited by examiner

*Primary Examiner* — Kenneth M Lo
*Assistant Examiner* — Yuhui R Pan
(74) *Attorney, Agent, or Firm* — Miller, Matthias & Hull LLP

(57) ABSTRACT

An interference checking device 1 checks, during machining using an NC machine tool 20, interference between structures of the NC machine tool 20, a tool and a workpiece, and includes an interference check processing unit 2 virtually moving models and checking the occurrence of interference based on a position control signal from a numerical controller 30, and an operation effect degree evaluating unit 6 evaluating the degree of an effect of an operation on a possibility of the occurrence of interference. When a predetermined operation is performed during machining of a workpiece following a first workpiece, the interference check processing unit 2 moves the models at intervals determined based on the degree of the effect evaluated by the operation effect degree evaluating unit 6.

4 Claims, 6 Drawing Sheets

FIG. 4

|  | Number of positions obtained from NC per second |
|---|---|
| Trial mode 1 (Effect degree 1) | 3 |
| Trial mode 2 (Effect degree 2) | 7 |
| Trial mode 3 (Effect degree 3) | 10 |

FIG. 5

| Classification | Operation | Effect degree |
|---|---|---|
| Operation panel | NC power supply | 1 |
| | MEM | 1 |
| | MDI | 1 |
| | DNC | 1 |
| | EDIT | 3 |
| | JOG | 2 |
| | ZRN | 1 |
| | Rapid traverse | 2 |
| | Handle(×1, ×10, ×100) | 2 |
| | Emergency stop | 3 |
| | Reset | 3 |
| | Stop | 1 |
| | Single block | 1 |
| | BDT | 3 |
| Soft key | Switching mass-production machining/trial machining | 3 |
| | Program editing | 3 |
| | BG editing | 2 |
| | O search | 2 |
| | N search | 2 |
| | F search | 2 |
| | Program rewind | 1 |
| | Change of workpiece offset value | 3 |
| | Change of shape offset value | 3 |
| | Change of wear offset value | 1 |
| Model | Tool model | 3 |
| | Table model | 3 |
| | Spindle model | 3 |
| Others | Interactive direct operation | 1 |
| | End of program | 1 |
| | Macro variable | 3 |
| | Editing key | 1 |
| | Scheduled operation | 1 |

FIG. 6

| Program editing | | Weight |
|---|---|---|
| Number of Lines to be edited | 3 or more | 1 |
| | less than 3 | 0.8 |
| Contents of Editing | coordinate value included | 1 |
| | Others | 0.5 |

INTERFERENCE CHECKING DEVICE

BACKGROUND

Field of the Disclosure

The present disclosure relates to an interference checking device which checks whether interference occurs between components, such as a structure of a numerically controlled machine tool (NC machine tool), a tool and a workpiece.

Background of the Disclosure

On an NC machine tool, the operations of its drive mechanisms (e.g., a feed mechanism, a spindle motor, etc.) are usually controlled by a numerical controller in accordance with a previously generated machining program.

Conventionally, when operating such a drive mechanism in accordance with the machining program, it is checked whether the movement of a movable structure (e.g., a tool rest, a saddle, a table, a spindle head, etc.) driven by the drive mechanism causes interference between structures (including fixed structures and movable structures) which are components of the machine tool, a tool and a workpiece. This check is performed because, if the machining program includes an error, there is a risk that, when the drive mechanism is operated in accordance with the machining program, interference occurs between the structures, the tool and the workpiece, thereby inflicting serious damage on the structures, the tool or the workpiece.

Conventional examples of apparatus for performing such an interference check are provided in Japanese Unexamined Patent Application Publication Nos. H10-55209 ("JP '209") and 2009-54043 ("JP '043").

The numerical controller disclosed in JP '209 has tool-interference-check processing means performing a tool interference check on a machining program, and tool-interference-check-necessity determining means determining the necessity of the tool interference check. The tool-interference-check-necessity determining means is configured to compare the date of execution of the tool interference check with the date of change of tool-related data settings and thereby, if the tool interference check is not executed after a change of the tool-related data settings, determine that the tool interference check is necessary, and the too-interference-check processing means is configured to, based on the result of the determination of the tool-interference-check necessity determining means, execute the tool interference check only when the tool interference check is necessary.

According to the numerical controller of JP '209, since the tool interference check is executed after a change of the tool-related data settings, that is, only when the tool interference check is necessary, an effect of avoiding unnecessary repetition of the tool interference check and improving the processing speed of the numerical controller is obtained.

Further, the numerical controller disclosed in JP '043 has a function of defining an interference area for each of a plurality of machine structures, moving the interference areas based on machine coordinate values of the machine structures which are updated by interpolation processing, and checking whether the interference areas for the machine structures interfere with each other. This numerical controller has automatic interference-check-calculation-cycle adjustment means for automatically adjusting a cycle of interference check calculation by dividing an operation time required for interference check processing by a time occupied by the interference check processing in one interpolation processing cycle, interference-area expanding means for expanding the interference areas based on the maximum feed speed of each axis and the cycle of interference check calculation, and means for checking whether the expanded interference areas interfere with each other.

According to the numerical controller of JP '043, since the cycle of interference check calculation is automatically adjusted, even if the amount of the interference check is increased, the interference check calculation can surely be completed without affecting the interpolation processing by the numerical controller.

SUMMARY OF THE DISCLOSURE

Incidentally, in the above-mentioned interference checks, generally, two-dimensional or three-dimensional models (hereinafter, simply referred to as "models" in this subsection) of the structures of the NC machine tool and the tool and workpiece attached to the structures are used, and the interference check is performed by generating the models being moved at predetermined time intervals or travel distance intervals (hereinafter, simply referred to as "intervals" in this subsection) in accordance with the machining program, and checking whether the generated models of the structures, tool and workpiece overlap each other.

Therefore, by shortening the model generation interval, models being moved on a smaller distance basis can be generated as shown in FIG. 7, and thereby a more minute, i.e., a highly accurate interference check can be performed. In this case, however, there is a disadvantage that the model generation processing requires time and therefore the interference check takes a long time. It is noted that, in FIG. 7, 101 denotes a spindle, 102 denotes a chuck, W denotes a workpiece, and 103 denotes a tool rest. FIG. 7 depicts models of the spindle 101, the chuck 102, the workpiece W and the tool rest 103 in a situation where, when the tool rest 103 is moved from a position Pa to a position Pe, it is moved to and located at intermediate positions of a position Pb, a position Pc and a position Pd, including being located at the position Pa and the position Pe. In this example, as seen from FIG. 7, the tool rest 103 and the workpiece W interfere with each other when the tool rest 103 is moved to the position Pc.

On the other hand, extending the model generation interval makes it possible to reduce the time required for the model generation processing, and there is an advantage that the interference check can be executed in a short time. In this case, however, there is a disadvantage that fewer models are generated as shown in FIG. 8 and it is therefore not possible to perform a highly accurate interference check. It is noted that, although FIG. 8 also depicts the situation where the tool rest 103 is moved from the position Pa to the position Pe, in this example, only models of the spindle 101, the chuck 102, the workpiece W and the tool rest 103 at the times when the tool rest 103 is positioned at the position Pa and is moved to and positioned at the position Pe are generated, and these models show that the tool rest 103 and the workpiece W do not overlap each other. Therefore, when the models are generated at such intervals, interfere between the tool rest 103 and the workpiece W, which occurs in actual machining, cannot be checked (detected).

Thus, in an interference check using models, the accuracy of the interference check and the processing time thereof have a trade-off relationship. Shortening the model generation interval allows a highly accurate interference check but brings the disadvantage of a longer processing time. To the contrary, extending the model generation interval reduces the processing time but brings the disadvantage that a highly accurate interference check cannot be performed.

Further, the necessity of an interference check is not limited to a case where machining is performed using a machining program with no machining performance record. Continuous machining using a machining program with machining performance records also requires an interference check to be performed in a case where the continuous machining is suspended to perform a predetermined operation and then resumed. For example, when restarting a machine which has been suspended in the middle of a machining operation for manual operation, if the machine is not in the state immediately after the suspension or if the block where the machining program is resumed is wrong, there is a risk that interference may occur.

A possibility that interference is caused by such an operation varies depending on the type of the operation. For example, as for an operation of manually returning a tool rest to its origin, even if machining is performed after the operation, the possibility of occurrence of interference is relatively low. However, when a tool offset value is changed or when a block delete operation or the like is performed, the possibility of occurrence of interference is high.

According to the above-described background, therefore, after an operation which is highly likely to cause interference is performed, although the processing time is longer, it is preferred that an interference check with a shorter model generation interval be performed so that a more accurate interference check can be performed. On the other hand, after an operation which is unlikely to cause interference is performed, although the accuracy is low, it is preferred to perform an interference check with a longer model generation interval and thereby a shorter processing time.

However, in each of the above-described conventional numerical controllers disclosed in JP '209 and JP '043, the model generation interval is fixed and therefore it is not possible to perform an efficient interference check corresponding to an operation by the operator. Although the numerical controller of JP '043 is configured to automatically adjust the cycle of interference check calculation based on the number of combinations of three-dimensional figures for the interference check and the number of three-dimensional figures to be checked for interference, in a case where these numbers are not changed, that is, machining is performed by the same machine tool using the same machining program, the model generation interval is fixed.

Further, although the numerical controller disclosed in JP '209 is configured to perform the interference check when the tool-related data settings are changed, the interference check is not performed when an operation other than the change of the data settings is performed by the operator.

In view of the above-described circumstances, an object of the present disclosure is to provide an interference checking device which perform interference check by moving a model at time intervals or travel distance intervals which are set corresponding to an operation input to a numerical controller, thereby enabling an efficient interference check corresponding to the operation.

The present disclosure, for solving the above-described problems, relates to an interference checking device connected to a machine tool having a plurality of structures including at least two structures respectively holding a tool and a workpiece, a drive mechanism driving a movable structure which is among the plurality of structures and is provided to be movable, a numerical controller analyzing a machining program to generate a position control signal for the movable structure and controlling the drive mechanism based on the generated position control signal to control the position of the movable structure, and an input device for inputting a signal relating to an operation to the numerical controller, the interference checking device including:

an interference check processing unit which, based on the position control signal generated for controlling the position of the movable structure, virtually moves a two-dimensional model or three-dimensional model of at least one of the tool, the workpiece and the structures, to check whether interference occurs between at least two of the tool, the workpiece and the structures; and an operation effect degree evaluating unit which, based on a signal relating to an operation which is input to the input device, evaluates the degree of an effect of the operation on a possibility that interference occurs between at least two of the tool, the workpiece and the structures, wherein the interference check processing unit is configured to: when a first workpiece is machined, execute a first check processing of virtually moving a two-dimensional model or three-dimensional model of at least one of the tool, the workpiece and the structures at predetermined time intervals or travel distance intervals to check whether interference occurs between at least two of the tool, the workpiece and the structures; and when one or a plurality of subsequent workpieces are machined after the machining of the first workpiece is completed, in a case where a signal relating to an operation is input to the input device before or during machining the subsequent workpieces, execute a second check processing of virtually moving a two-dimensional model or three-dimensional model of at least one of the structures, the tool and the workpiece at time intervals or travel distance intervals determined in accordance with the degree of the effect of the operation which is evaluated by the operation effect degree evaluating unit to check whether interference occurs between at least two of the tool, the workpiece and the structures.

According to this interference checking device, based on the position control signal generated for controlling the position of the movable structure, the interference check processing unit virtually moves a two-dimensional model or three-dimensional model (hereinafter, simply referred to as "model" in this subsection) of at least one of the tool, the workpiece and the structures at certain time intervals or travel distance intervals (hereinafter, simply referred to as "interval" in this subsection), in other words, generates the model being moved at the intervals, and checks whether interference occurs between at least two of the tool, the workpiece and the structures, that is, whether at least two models overlap each other.

At this time, the interference check processing unit executes, when machining a first workpiece, a first check processing of virtually moving the model of at least one of the tool, the workpiece and the structures at predetermined first intervals, and, when machining one or a plurality of subsequent workpieces after completion of the machining of the first workpiece, in case where a signal relating to an operation is input to the input device before or during machining the subsequent workpieces, a second check processing of virtually moving the model of at least one of the tool, the workpiece and the structures at second intervals which is determined in accordance with the degree of the effect evaluated by the operation effect degree evaluating unit.

The first check processing is a check processing which is performed when a first workpiece is machined. The machining of the first workpiece is usually equivalent to a case of machining a workpiece for the first time after the machine tool is activated or a case of machining a workpiece for the first time using a new machining program. In such cases, the model being moved at the first intervals, i.e., relatively short intervals, is generated and the interference check is performed using the generated model. As a result, although the check processing requires some time, the interference check is performed at narrower intervals, which makes it possible to perform a highly accurate interference check. When a workpiece is machined after the machine tool is activated and when a workpiece is machined using a new machining program, the safety of the machining has not been confirmed. Therefore, performing such a highly accurate interference check ensures the safety of the machining.

In the case where a signal relating to an operation (a stop signal, a temporary suspension signal or an input signal for editing the machining program) is input to the input device before or during machining the subsequent workpiece (i.e., during the machining operation), the second check processing is executed. In this second check processing, as described above, the model being virtually moved at the second intervals determined in accordance with the degree of the effect evaluated by the operation effect degree evaluating unit is generated and the interference check is performed based on the generated model.

The degree of the effect of the operation performed in accordance with the signal input to the input device on the safety of the machining varies depending on the type of the operation. For example, as for an operation of switching on or off a power supply of the numerical controller, an operation of returning a tool rest to its origin and an operation of temporarily suspending the machining, the safety of the machining remains intact even if the machining is started or restarted after the operation. However, in a case where an operation of moving the tool rest to an appropriate location after suspension of the machining or an operation of editing the machining program is preformed and then the machining is started or restarted, there is a high possibility that the safety of the machining is deteriorated.

Therefore, in the interference checking device of the present disclosure, the operation effect degree evaluating unit evaluates the degree of the effect of the operation on the possibility that interference occurs, and, in the second check processing, the second interval is determined in accordance with the degree of the effect evaluated by the operation effect degree evaluating unit. That is, for example, in a case of an operation which is judged to have a low possibility of causing interference, the second interval is determined to a certain long interval taking processing efficiency into consideration, and in a case of an operation judged to have a high possibility of causing interference, the second interval is determined to an interval shorter than the above interval. Thereafter, the above-described interference check is performed using the determined intervals. Thereby, an optimum interference check corresponding to operation contents can be performed while both processing efficiency for the interference check and machining efficiency are satisfied.

Thus, according to the interference checking device of the present disclosure, it is possible to perform an optimum interference check corresponding to the state of the machine tool.

It is noted that, in the present disclosure, the interference checking device may further include a mode switching processing unit and may be configured so that, when executing the second check processing, the interference check processing unit checks whether interference occurs between at least two of the tool, the workpiece and the structures, in any one of a plurality of modes which are determined in accordance with the degree of the effect evaluated by the operation effect degree evaluating unit and are different from each other in the interval thereof, and the mode switching processing unit switches the mode to be executed in the second check processing of the interference check processing unit in accordance with the degree of the effect evaluated by the operation effect degree evaluating unit.

Further, it is preferable that the operation effect degree evaluating unit is configured to, when signals relating to a plurality of operations the effect degrees of which are different from each other are input from the input device, designate the maximum effect degree out of the effect degrees corresponding to the operations as the evaluation result. Through this process, the interference check with the highest accuracy is executed in the second check processing, and thereby an optimum interference check corresponding to an operation risk level can be achieved.

Further, the operation effect degree evaluating unit may be configured to perform the evaluation so that the effect degree of one operation varies depending on the contents thereof. For example, when the same operation is repeated several times, the uncertainty of the NC machine tool increases as the number of repetitions increases. Further, as for an operation of editing a program, when comparing a case of editing one line with a case of editing 10 lines, the uncertainty of the NC machine tool is higher in the case of editing 10 lines. Therefore, in such cases, the operation effect degree evaluating unit performs the evaluation so that, when, even though the same operation is performed, the effect degree thereof on interference (the possibility of interference) is higher due to the contents thereof, the effect degree of the operation is higher, thereby allowing the interference check processing unit to perform the interference check using narrower intervals. Thereby, a more reliable interference check is achieved, and thereby the safety of the machining is further improved.

As described above, according to the interference checking device of the present disclosure it is possible to perform an optimum interference check corresponding to the state of the machine tool. Particularly, since, when a signal relating to an operation is input from the input device, an interference check is performed using an interval corresponding to the possibility that interference is caused by the operation, an optimum interference check corresponding to operation contents can be performed while both processing efficiency for the interference check and machining efficiency are satisfied.

BRIEF DESCRIPTION OF THE DRAWINGS

For a more complete understanding of the disclosed methods and apparatus, reference should be made to the embodiment illustrated in greater detail on the accompanying drawings, wherein:

FIG. 4 is an explanatory diagram for explaining a processing interval in each mode of the embodiment;

FIG. 5 is an explanatory diagram showing data stored in an operation effect degree storage unit according to the embodiment;

FIG. 6 is an explanatory diagram showing data stored in a weighted data storage unit according to the embodiment;

It should be understood that the drawings are not necessarily to scale and that the disclosed embodiments are sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiments illustrated herein.

DETAILED DESCRIPTION

Figure 1:
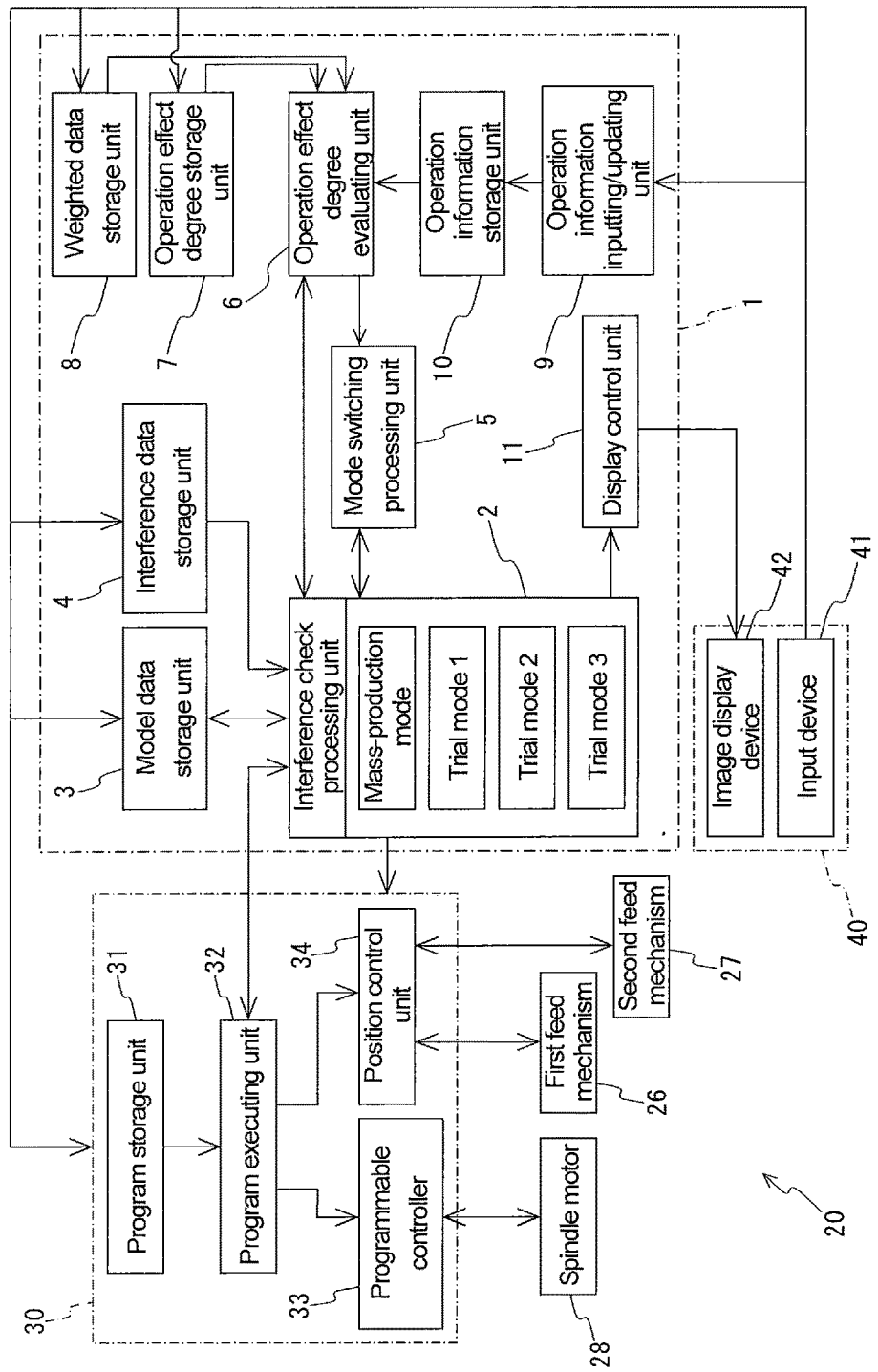
FIG. 1 is a block diagram showing a schematic configuration of an interference checking device, etc., according to one embodiment of the present disclosure.

Hereinafter, a specific embodiment of the present disclosure will be described with reference to the drawings. As shown in FIG. 1, an interference checking device 1 of this embodiment is connected to a numerical controller 30 of an NC lathe 20 (NC machine tool).

Configuration of NC Lathe

Figure 2:
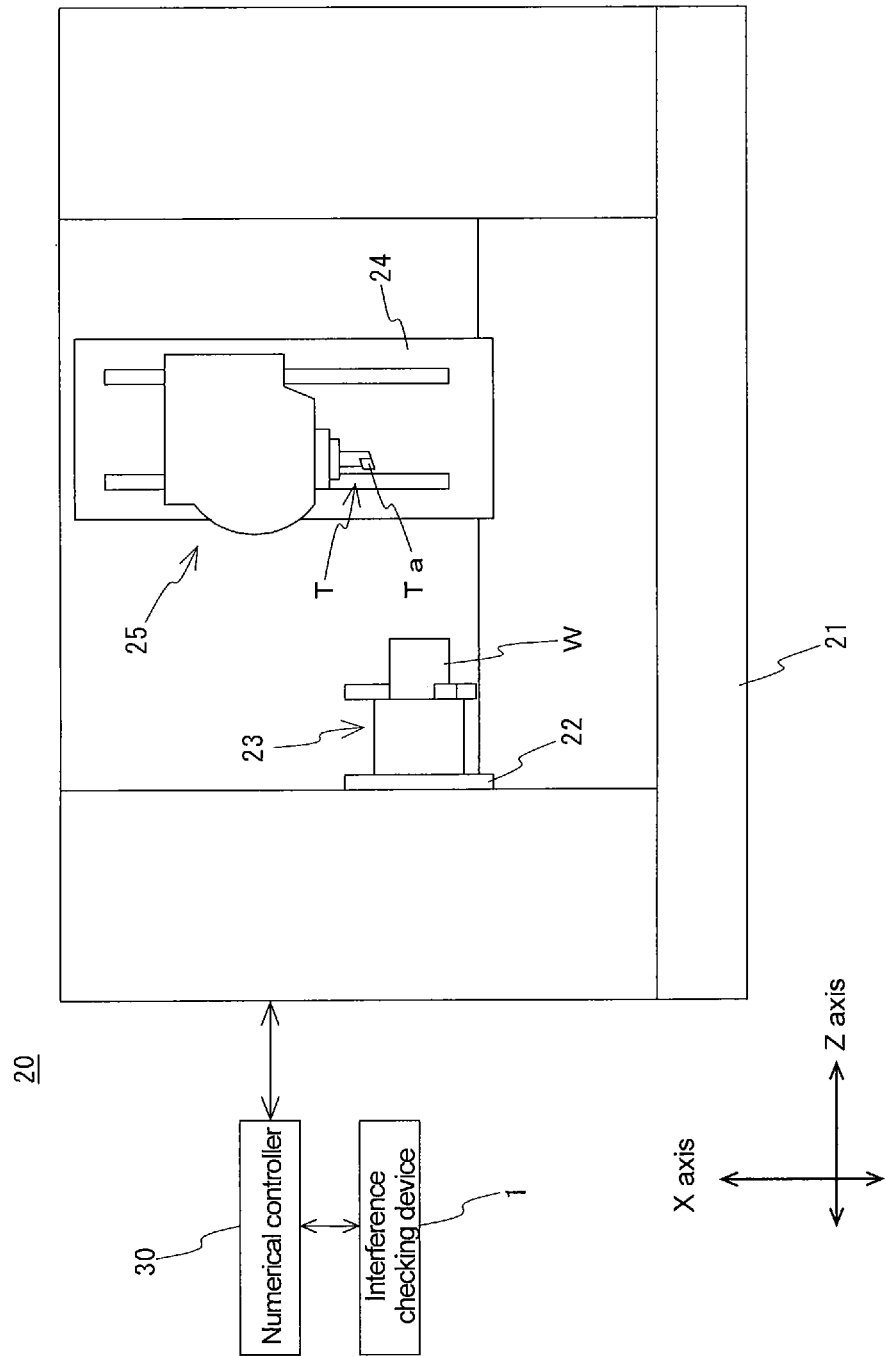
FIG. 2 is a front view showing a schematic configuration of an NC lathe according to the embodiment.

First of all, a schematic configuration of the NC lathe 20 will be described. As shown in FIGS. 1 and 2, the NC lathe 20 of this embodiment includes: a plurality of structures, such as a bed 21, a headstock (not shown), a spindle 22 held by the headstock (not shown) to be rotatable, a chuck 23 attached to the spindle 22, a carriage 24 disposed on the bed 21 to be movable in the direction of a Z axis indicated by an arrow, and a tool rest 25 disposed on the carriage 24 to be movable in the direction of an X axis indicted by an arrow; drive mechanisms such as a first feed mechanism 26 which moves the carriage 24 in the Z-axis direction, a second feed mechanism 27 which moves the tool rest 25 in the X-axis direction, and a spindle motor 28 which rotates the spindle 22; the numerical controller 30 which controls the operations of the drive mechanisms; and an operation panel 40 having an input device 41 and an image display device 42. A workpiece W is held by the chuck 23, and a tool T is mounted on the tool rest 25. Thus, in the NC lathe 20 of this embodiment, the carriage 24 and the tool rest 25 are movable structures.

As shown in FIG. 1, the numerical controller 30 includes a program storage unit 31, a program executing unit 32, a programmable controller 33 and a position control unit 34. The program storage unit 31 stores therein an NC program generated in advance.

The program executing unit 32 analyzes the NC program stored in the program storage unit 31 sequentially block by block to extract operation commands relating to the travel position and the feed speed of the tool rest 25, the rotational speed of the spindle motor 28 and the like, generates position control signals for controlling the position of the tool rest 25 at predetermined time intervals based on the extracted operation commands relating to the tool rest 25, and transmits the generated position control signals to the position control unit 34 and transmits the operation commands relating to the spindle motor 28 to the programmable controller 33.

The programmable controller 33 sequentially receives the operation commands from the program executing unit 32 and performs a processing for controlling the rotation of the spindle 22. Specifically, the programmable controller 33 generates control signals based on current-rotational-speed data fed back from the spindle motor 28 and the operation commands, and transmits the generated control signals to the spindle motor 28 to control it.

Further, the position control unit 34 sequentially receives the position control signals from the program executing unit 32 and performs a processing for controlling the travel of the tool rest 25, etc. Specifically, the position control unit 34 generates drive signals based on current-position data fed back from the first and second feed mechanisms 26 and 27 and the position control signals, and transmits the generated drive signals to the first feed mechanism 26 and the second feed mechanism 27 to control them.

Configuration of Interference Checking Device

Next, a configuration of the interference checking device 1 will be described. As shown in FIG. 1, the interference checking device 1 includes an interference check processing unit 2, a model data storage unit 3, an interference data storage unit 4, a mode switching processing unit 5, an operation effect degree evaluating unit 6, an operation effect degree storage unit 7, a weighted data storage unit 8, an operation information inputting/updating unit 9, an operation information storage unit 10, and a display control unit 11.

The model data storage unit 3 stores therein three-dimensional model data on at least the tool T, the workpiece W, the spindle 22, the chuck 23, the carriage 24 and the tool rest 25, which is generated as appropriate in advance using a three-dimensional CAD system or the like.

Further, the interference data storage unit 4 stores therein preset interference data defining interference relationships between the tool T, the workpiece W, the spindle 22, the chuck 23, the carriage 24 and the tool rest 25. On the NC lathe 20 of this embodiment, no interference relationship arises between the spindle 22, the chuck 23 and the workpiece W and between the carriage 24, the tool rest 25 and the tool T, and, on the other hand, an interference relationship arises between a set of the spindle 22, the chuck 23 and the workpiece W and a set of the carriage 24, the tool rest 25 and the tool T. However, no interference relationship arises between the workpiece W and a chip Ta which is a cutting edge of the tool T. In this embodiment, interference data defining such interference relationships is stored in the interference data storage unit 4.

When the numerical controller 30 is activated, the interference check processing unit 2 starts a processing in synchronization therewith. The interference check processing unit 2 reads out the three-dimensional model data on the tool T, the workpiece W, the spindle 22, the chuck 23, the carriage 24 and the tool rest 25, which is stored in the model data storage unit 3, arranges three-dimensional models thereof in an appropriate virtual three-dimensional space, and shifts to a stand-by state. Then, the interference check processing unit 2 monitors the processing of the program executing unit 32, and, when the program executing unit 32 starts a machining program, executes the following interference check processing.

That is, the interference check processing unit 2 receives the position control signals (position information) from the program executing unit 32 and generates, based on the received position control signals, three dimensional models in which the three-dimensional models of the carriage 24, the tool rest 25 and the tool T are virtually moved at predetermined time intervals, and checks whether the generated three-dimensional models of the spindle 22, the chuck 23 and the workpiece W and the generated three-dimensional models of the carriage 24, the tool rest 25 and the tool T overlap each other. When they three-dimensional models overlap each other, the interference check processing unit 2 refers to the interference data stored in the interference data storage unit 4 and determines the occurrence of interference. When the occurrence of interference is confirmed, the interference check processing unit 2 transmits an alarm signal to the numerical controller 30 to stop the machining.

It is noted that, in this interference check processing, a position control signal for a travel position a predetermined time ahead from the position control signal generated for controlling the position of the tool rest 25 is sequentially input from the program executing unit 32. Based on the input position control signals, the interference check processing precedes the actual machining by the predetermined time.

The interference check processing is performed in any one of four modes, i.e., a trial mode 1, a trial mode 2, a trial mode 3, which differ from each other in a time interval for moving the three-dimensional models, and a mass-production mode in which the three-dimensional models are moved to a position commanded in the machining program. As shown in FIG. 4, the time interval becomes shorter in the order of the trial mode 1, the trial mode 2 and the trial mode 3. In the example shown in FIG. 4, the number of the position control signals input from the program executing unit 32 per second (the number of positions) is 3, 7, and 10 in the trial mode 1, the trial mode 2 and the trial mode 3, respectively. In each mode, an interpolation processing is performed between the position control signals and the three-dimensional models are moved at the determined time intervals.

It is noted that conditions for the interpolation processing in the example shown in FIG. 4 are determined based on the maximum feed speeds of the first feed mechanism 26 and the second feed mechanism 27. The conditions are set so that the travel interval when the tool rest 25 is moved at these maximum feed speeds is 20 mm or less, 15 mm or less, and 10 mm or less in the trial modes 1, 2 and 3, respectively. The reason for performing the interpolation processing is that a processing time required for calculating one position control signal by the interpolation processing is shorter than a processing time required for inputting one position control signal from the program executing unit 32, and therefore, a processing time required for obtaining the necessary number of the position control signals can be reduced by performing such an interpolation processing.

Further, the display control unit 11 performs a processing for displaying each of the three-dimensional models generated sequentially at predetermined time intervals by the interference check processing unit 2 on the image display device 42.

The operation information storage unit 10 is a functional unit which stores therein information relating to operations as shown in FIG. 5. When a signal relating to an operation is input from the input device 41 to the numerical controller 30, information on the operation is input into the operation information storage unit 10 by the operation information inputting/updating unit 9, and further, operation information already stored therein is updated. It is noted that, when the operation is a program editing, the number of lines to be edited and contents of editing, as shown in FIG. 6, are also stored in the operation information storage unit 10 via the operation information inputting/updating unit 9.

The operation effect degree storage unit 7 is a functional unit which stores therein a relationship between operation and effect degree in the form of a data table as shown in FIG. 6. This data table is previously stored in the operation effect degree storage unit 7 through the input device 41, and can be set or changed as appropriate through the input device 41 by the operator. The degree of an effect of an operation on the safety of the machining varies depending on the type of the operation. For example, as for an operation of switching on or off a power supply of the numerical controller, an operation of returning the tool rest to its origin and an operation of temporarily suspending the machining, the safety of the machining remains intact even if the machining is started or resumed after the operation. However, in a case where an operation of moving the tool rest to an appropriate location after suspension of the machining or an operation of editing the machining program is executed and then the machining is started or resumed, there is a high possibility that the safety of the machining is deteriorated. The effect degree is an index indicating the degree of an effect of an operation on a possibility that interference is caused by the operation, and, as shown in FIG. 5, is preset for each of the operations and stored in the operation effect degree storage unit 7. In this example, a larger number indicates a higher possibility of occurrence of interference.

The weighted data storage unit 8 is a functional unit which stores therein data on weighting in accordance with operation contents, as shown in FIG. 6. For example, in a case of an operation of editing a program, the possibility of occurrence of interference becomes higher as the number of lines to be edited is increased. Further, in a case of editing just one line, the possibility of occurrence of interference is low when a feed speed is edited, but is high when a coordinate value is edited. Weighting is an index for adjusting the effect degree taking into account difference of the possibility of occurrence of interference in the same operation, and is set in advance in accordance with operation contents.

The operation effect degree evaluating unit 6 monitors the operation of the program executing unit 32 via the interference check processing unit 2, reads out the operation information stored in the operation information storage unit 10 at a timing at which the program executing unit 32 executes the machining program, evaluates the effect degree of the operation indicated by the operation information with reference to the data stored in the operation effect degree storage unit 7 and the weighted data storage unit 8, transmits data on the evaluated effect degree to the mode switching processing unit 5, and then resets the data stored in the operation information storage unit 10.

For example, when the operation information stored in the operation information storage unit 10 is a program editing and the number of lines to be edited is two, the operation effect degree evaluating unit 6 refers to the data table of FIG. 5 stored in the operation effect degree storage unit 7 and reads out "effect degree 3" corresponding to the program editing, and also refers to the data table stored in the weighted data storage unit 8 and reads out weighting data "0.8". Then, the operation effect degree evaluating unit 6 multiplies the read-out effect degree and weighted data together to evaluate the effect degree (effect degree ED=3× 0.8=2.4), and transmits the resulting effect degree (ED=2.4) to the mode switching processing unit 5.

On the other hand, when the operation information stored in the operation information storage unit 10 is an operation not requiring weighting, that is, an operation not stored in the weighted data storage unit 8, for example, when the operation is a rapid traverse operation, the operation effect degree evaluating unit 6 refers to the data table of FIG. 5 stored in the operation degree storage unit 7 and reads out "effect degree 2" corresponding to rapid traverse in the same manner as described above, and transmits the read-out effect degree (ED=2) to the mode switching processing unit 5.

Further, when the operation information stored in the operation information storage unit 10 relates to a plurality of different operations, the operation effect degree evaluating unit 6 evaluates each of the operations in the same manner as described above and transmits the maximum effect degree out of the evaluated effect degrees to the mode switching processing unit 5.

Figure 3:
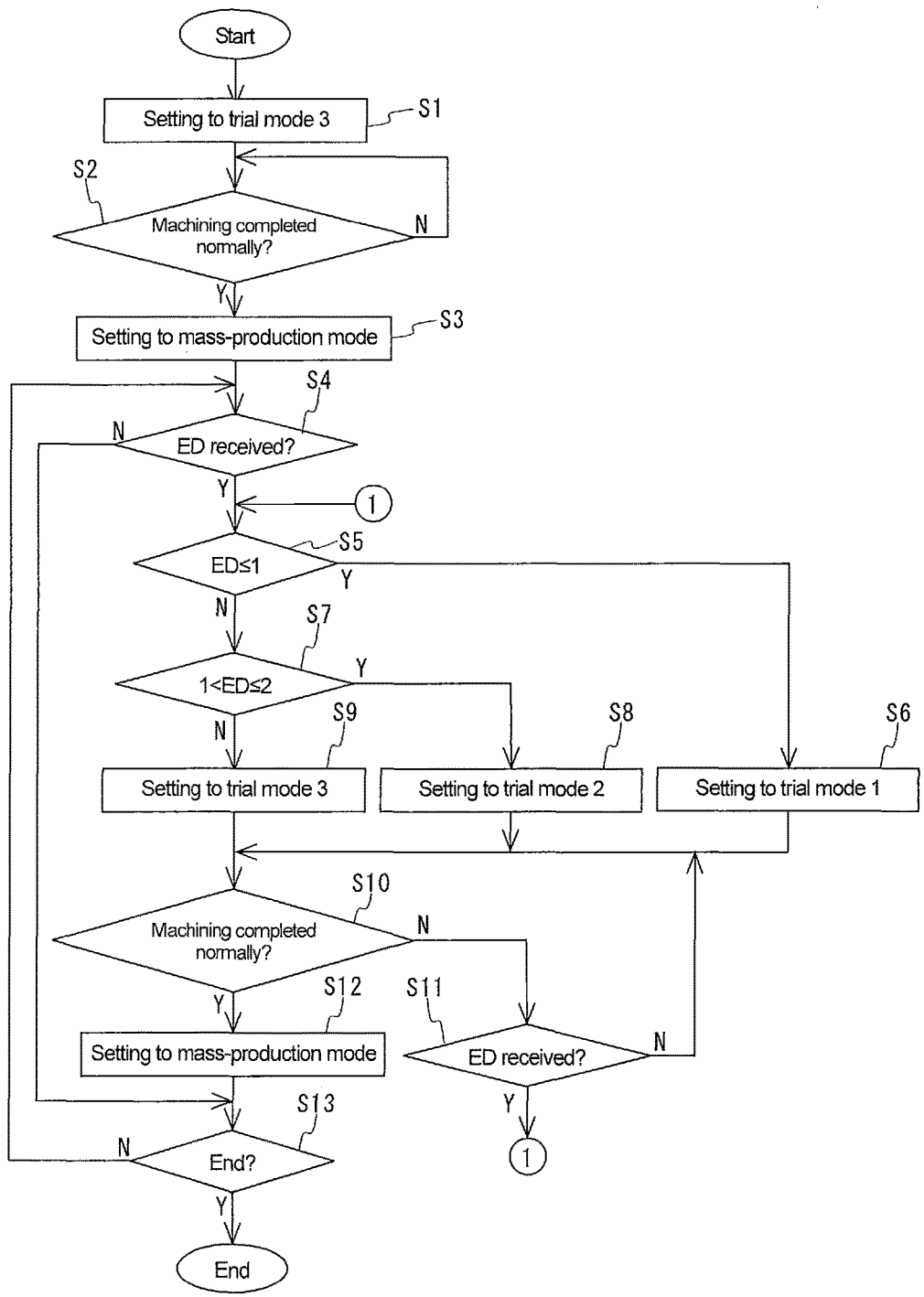
FIG. 3 is a flowchart showing a processing in a mode switching processing unit according to the embodiment.
Figure 7:
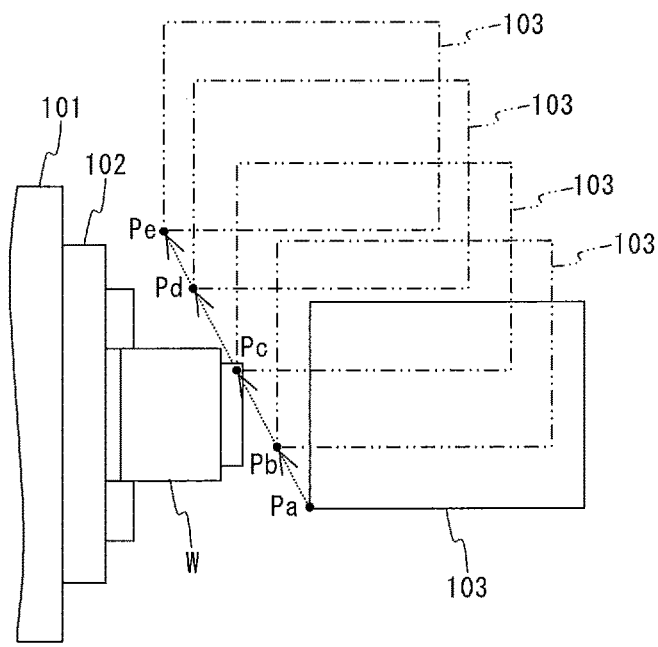
FIG. 7 is an illustration for explaining a relationship between interference check processing interval and interference check accuracy.
Figure 8:
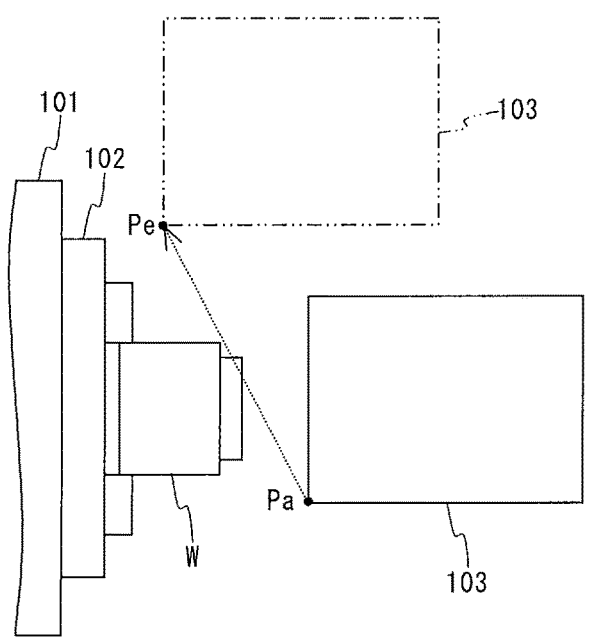
FIG. 8 is an illustration for explaining the relationship between interference check processing interval and interference check accuracy.

The mode switching processing unit 5 is a functional unit which switches the mode of the interference check processing executed by the interference check processing unit 2. Specifically, the mode switching processing unit 5 executes the processing shown in FIG. 3.

That is, the mode switching processing unit 5 starts the processing in synchronization with activating the numerical controller 30, and first performs a processing for setting the processing mode of the interference check processing unit 2 to the trail mode 3 (step S1). Subsequently, the mode switching processing unit 5 monitors the processing of the interference check processing unit 2 to check whether machining of the first workpiece has been completed normally (step S2), and, when it is confirmed that the machining has been completed normally, performs a processing for setting the processing mode of the interference check processing unit 2 to the mass-production mode (step S3). It is noted that, whether the machining has been completed normally can be confirmed by monitoring whether the interference check processing unit 2 has received a machining program end signal from the program executing unit 32.

Subsequently, the mode switching processing unit 5 monitors whether data on the effect degree (effect degree data) is transmitted from the operation effect degree evaluating unit 6 to the mode switching processing unit 5 (steps S4 and S13). When receiving the effect degree data (ED), the mode switching processing unit 5 sets the processing mode of the interference check processing unit 2 to the trial mode 1 when ED≤1 is satisfied (steps S5 and S6), sets it to the trial mode 2 when 1<ED≤2 is satisfied (steps S7 and S8), and sets it to the trial mode 3 when 2<ED is satisfied (steps S7 and S9).

Thereafter, the mode switching processing unit 5 monitors whether machining of a subsequent workpiece following the machining of the first workpiece has been completed normally (step S10) and also monitors whether effect degree data is transmitted from the operation effect degree evaluating unit 6 to the mode switching processing unit 5 (steps S11). When receiving the effect degree data (ED) during the machining, the mode switching processing unit 5 executes the processing of steps S5 to S10. On the other hand, when confirming, at step S10, that the machining of the subsequent workpiece has been completed normally, the mode switching processing unit 5 sets the processing mode of the interference check processing unit 2 to the mass-production mode (step S3).

Afterward, the mode switching processing unit 5 repeats the processing of steps S4 to S13, and ends the series of processing at a timing at which the power supply of the numerical controller 30 is turned off (step S13). Through the above-described processing, the mode switching processing unit 5 sets the process mode of the interference check processing unit 2, and the interference check processing unit 2 executes 1 its processing in the set processing mode.

Interference Check Operation by Interference Checking Device

According to the interference checking device 1 having the above-described configuration, when a workpiece W is machined by the NC lathe 20, interference between the set of the spindle 22, the chuck 23 and the workpiece W and the set of the carriage 24, the tool rest 25 and the tool T is checked in the following manner. It is noted that, three-dimensional models sequentially generated at a predetermined time intervals by the interference check processing unit 2 are displayed sequentially by the image display device 42 through the display control unit 11.

The interference checking device 1 starts its processing in synchronization with activating the numerical controller 30, and first causes the mode switching processing unit 5 to set the processing mode of the interference check processing unit 2 to the trail mode 3. Then, the interference check processing unit 2 monitors the processing of the program executing unit 32, and, when a machining program is started by the program executing unit 32, that is, when machining of the first workpiece W is started, executes an interference check processing in the trial mode 3 (first check processing) preceding the actual machining by a predetermined time period.

As described above, as for the processing mode of the interference check processing unit 2, the time intervals of the trial mode 1, the trial mode 2 and the trial mode 3 are sequentially shorter. Therefore, although the trial mode 3 allows the interference check with the highest accuracy, thereby providing a high level of machining safety, it has a disadvantage that the processing time is longer as a result of the shorter time interval for generating three-dimensional models. Because the above-described machining of the first workpiece W may involve an unpredictable unstable element, in this embodiment, the interference check is performed in the trial mode 3 providing the highest accuracy and the highest machining safety.

Subsequently, when the machining of the first workpiece W has been completed normally, the mode switching processing unit 5 sets the processing mode of the interference check processing unit 2 to the mass-production mode. Thereafter, during machining of subsequent workpieces W, the interference check processing unit 2 performs the interference check in the mass-production mode in which the three-dimensional models are moved to positions commanded in the machining program. This interference check in the mass-production mode provides the lowest accuracy. However, in a case where the machining of the first workpiece W has been completed normally, the safety of the machining is confirmed. Therefore, as for machining of the subsequent workpieces W, the machining safety can be ensured even though the interference check is performed in the mass-production mode providing the lowest accuracy. In addition, since the mass-production mode allows the fastest interference check processing, the interference check does not hamper the machining. It is noted that, until the machining of the first workpiece W is completed normally, the interference check is performed continuously in the trial mode 3.

When a signal relating to a certain operation is input from the input device 41 to the numerical controller 30 before or after the start of the processing of the subsequent workpieces W, information on the certain operation is stored in the operation information storage unit 10 by the operation information inputting/updating unit 9, and at a timing at which the program executing unit 32 executes the machining program, the operation effect degree evaluating unit 6 evaluates the effect degree of the operation, based on the operation information stored in the operation information storage unit 10 and on data stored in the operation effect degree storage unit 7 and the weighted data storage unit 8, and transmits data on the evaluated effect degree to the mode switching processing unit 5. Then, the mode switching processing unit 5 sets the processing mode of the interference check processing unit 2 to the processing mode corresponding to the evaluated effect degree (second check processing).

In the case of an operation with a low possibility of occurrence of interference, for which the effect degree ED evaluated is ED≤1, the processing mode is set to the trial mode 1. In a case of an operation with a moderate possibility of occurrence of interference, for which the effect degree ED evaluated is 1<ED≤2, the processing mode is set to the trial mode 2. In a case of an operation with a high possibility of occurrence of interference, for which the effect degree ED evaluated is ED<2, the processing mode is set to the trial mode 3.

Then, the interference check processing unit 2 performs the interference check in the thus determined processing mode. As a result, an appropriate interference check taking into account the possibility that interference is caused by the operation can be performed. It is noted that, the accuracy of the interference check and the processing speed thereof have a trade-off relationship. Performing the interference check with a high accuracy makes the processing time of the interference check longer, and lowering the accuracy of the interference check makes it possible to perform the interference check processing quickly. Hence, by performing the interference check with an accuracy determined taking into account the possibility that interference is caused by the operation, an optimum interference check corresponding to operation contents can be performed while both securing of machining safety and machining efficiency are satisfied without causing an unnecessary machining delay.

On the other hand, when an operation signal is not input from the input device 41 to the numerical controller 30 at the time of the machining of the subsequent workpieces W, the interference check is executed continuously in the mass-production mode.

As describe above, according to the interference checking device 1 of this embodiment, since, when the first workpiece W is machined, the interference check is carried out in the trail mode 3 with the highest machining safety and the highest accuracy, even if an unstable element is involved in the machining at the time of starting it, the machining can be started with a high safety. Further, once the safety of the machining is confirmed to prove the fact that the machining safety is ensured, the interference check is performed in the mass-production mode with the lowest accuracy, the machining can be performed without deteriorating expected machining efficiency in a state where machining safety is ensured.

Further, since when an operation signal is input from the input device 41 to the numerical controller 30 at the time of machining of subsequent workpieces W following the first workpiece W, the interference check is performed with an accuracy determined taking into account the possibility that interference is caused by the operation, an optimum interference check corresponding to operation contents can be performed while both ensuring of machining safety and machining efficiency are satisfied without causing an unnecessary machining delay.

Thus, one embodiment of the present disclosure has been described. However, a specific mode in which the present disclosure can be realized is not limited thereto.

For example, although, in the above embodiment, three modes, i.e., the trial modes 1 to 3, are set as interference check processing modes having higher accuracy than the mass-production mode, the present disclosure is not limited thereto, and two modes or four or more modes may be set. In brief, the modes should be appropriately set taking into account both check accuracy determined taking into account an operation effect on interference and machining speed depending on the determined check accuracy.

Further, although, in the above embodiment, the interval for moving the three-dimensional models in the interference check processing unit 2 is a time-based interval, it is not limited thereto and may be set on the basis a travel distance for moving the three-dimensional models. That is, when the interference check is performed in the interference check processing unit 2, the three-dimensional models may be generated at predetermined travel distance intervals. In this case, the travel distance interval is determined to be shorter in the order of the trial mode 1, the trial mode 2 and the trial mode 3.

Further, although, in the above embodiment, program editing is given as an example of an operation the effect degree of which is weighted, the present disclosure is not limited thereto, and the weighting may be performed based on the number of times of the operation. In such a case, because it is conceivable that, even though the same operation is performed, machining safety is lowered as the numbers of times of the operation increases, the weighting is performed so that the effect degree is higher as the numbers of times of the operation increases.

Further, although, in the above embodiment, the interference check in the mass-production mode is performed, the interference check in the mass-production mode may not be performed.

Further, although, in the above embodiment, when an operation-related signal is input from the input device 41 to the numerical controller 30 before or after the start of the machining of the subsequent workpieces W, the processing mode of the interference check processing unit 2 is always switched, the present disclosure is not limited thereto, and, the processing mode of the interference check processing unit 2 may be switched only when an operation-related signal is input from the input device 41 to the numerical controller 30 before or after the start of machining of the subsequent workpieces W and a specific command included in the machining program (e.g., a command immediately after a pre-reading prohibition command) is executed.

Further, although, in the above embodiment, interference between the set of the spindle 22, chuck 23 and workpiece W and the set of the carriage 24, tool rest 25 and tool T is checked, such an interference relationship varies depending on the configuration of the NC machine tool, and usually, interference between at least two of the structures of the NC machine tool, the tool, and the workpiece is considered to be a problem.

Further, although, in the above embodiment, the interference check is performed using three-dimensional models, the present disclosure is not limited thereto, and two-dimensional models may be used for the interference check.

What is claimed is:

1. An interference checking device connected to a machine tool having a plurality of structures including at least two structures respectively holding a tool and a workpiece, a drive mechanism driving a movable structure which is among the plurality of structures and is provided to be movable, a numerical controller analyzing a machining program to generate a position control signal for the movable structure and controlling the drive mechanism based on the generated position control signal to control the position of the movable structure, and an input device for inputting a signal relating to an operation to the numerical controller, the interference checking device comprising:

an interference check processing unit which, based on the position control signal generated for controlling the position of the movable structure, virtually moves a two-dimensional model or three-dimensional model of at least one of the tool, the workpiece and the structures to check whether interference occurs between at least two of the tool, the workpiece and the structures; and an operation effect degree evaluating unit which, based on the signal relating to an operation input to the input device, evaluates a degree of effect which is an index indicating whether performing the operation increases a possibility of occurrence of interference between at least two of the tool, the workpiece and the structures in controlling the position of the movable body based on the position control signal, wherein the interference check processing unit is configured to: when a first workpiece is machined, execute a first check processing of virtually moving a two-dimensional model or three-dimensional model of at least one of the tool, the workpiece and the structures at predetermined time intervals or travel distance intervals to check whether interference occurs between at least two of the tool, the workpiece and the structures; and when one or a plurality of subsequent workpieces are machined after the machining of the first workpiece is completed, in a case where a signal relating to an operation is input to the input device before or during machining the subsequent workpieces, execute a second check processing of, at time intervals or travel distance intervals determined in accordance with the degree of effect evaluated by the operation effect degree evaluating unit so as to be shorter for a higher degree of effect which indicates a higher possibility of occurrence of interference, virtually moving a two-dimensional model or three-dimensional model of at least one of the tool, the workpiece and the structures to check whether interference occurs between at least two of the tool, the workpiece and the structures.

2. The interference checking device of claim 1, further comprising a mode switching processing unit, wherein:
when executing the second check processing, the interference check processing unit checks whether interference occurs between at least two of the tool, the workpiece and the structures, in any one of a plurality of modes different from each other in the time interval or travel distance interval determined in accordance with the degree of effect evaluated by the operation effect degree evaluating unit; and the mode switching processing unit switches the mode executed in the second check processing of the interference check processing unit in accordance with the degree of effect evaluated by the operation effect degree evaluating unit.

3. The interference checking device of claim 1, wherein:
when signals relating to a plurality of operations which are different from each other in the degree of effect thereof are input from the input device, the operation effect degree evaluating unit determines a maximum one of the degrees of the effect corresponding to the operations to be an evaluation result.

4. The interference checking device of claim 1, wherein:
the operation effect degree evaluating unit evaluates the degree of effect so that the degree of effect for an operation varies depending on contents thereof.

* * * * *